United States Patent [19]

Utsumi

[11] 3,896,606

[45] July 29, 1975

[54] DEVICE FOR INSERTING RECORDING TAPE CASSETTES IN CASES

[76] Inventor: Yoshikazu Utsumi, 47 Higashiura-cho Daigo Misasagi, Fushimi-ku, Kyoto, Kyoto Pref., Japan

[22] Filed: July 3, 1973

[21] Appl. No.: 376,198

[30] Foreign Application Priority Data

July 3, 1972 Japan ............................... 47-66790

[52] U.S. Cl. ........................ 53/266; 53/238; 53/253

[51] Int. Cl....... B65b 5/04; B65b 7/26; B65b 25/00

[58] Field of Search ............ 53/237, 238, 253, 266, 53/282, 50, 157

[56] References Cited

UNITED STATES PATENTS

| | | | |
|---|---|---|---|
| 1,621,316 | 3/1927 | Donnelly | 53/253 |
| 2,079,778 | 5/1937 | Thom | 53/238 X |
| 2,340,678 | 2/1944 | Milmoe | 53/238 X |
| 3,523,400 | 8/1970 | Daily | 53/50 X |

*Primary Examiner*—Robert L. Spruill

*Attorney, Agent, or Firm*—Armstrong, Nikaido & Wegner

[57] ABSTRACT

A device for automatically inserting cassettes and a description thereof into a casing. Casings having a lid are inserted into a turret disc and the lid is then opened. The description and cassette are inserted into the casing and then the lid is closed and the casing is removed from the turret disc.

4 Claims, 10 Drawing Figures

DEVICE FOR INSERTING RECORDING TAPE CASSETTES IN CASES

BACKGROUND OF THE INVENTION

Recording tape cassettes used for a tape recorder are contained in a case together with a description showing, for example, usage. The present invention relates to a device for automatically placing a recording tape cassette and a sheet of description into a case of a predetermined construction.

SUMMARY OF THE INVENTION

In the present invention, the cases are automatically and effectively intermittently moved. During the stopped portion of travel the cases are opened and a description and a recording tape cassette are inserted into each open case. The cases are then closed.

BRIEF DESCRIPTION OF THE DRAWINGS

The accompanying drawings show an embodiment of the present invention relating to a device for inserting recording tape cassettes in cases in which.

DESCRIPTION OF THE PREFERRED EMBODIMENT

An embodiment of the present invention will now be described with reference to the accompanying drawings.

Figure 1:
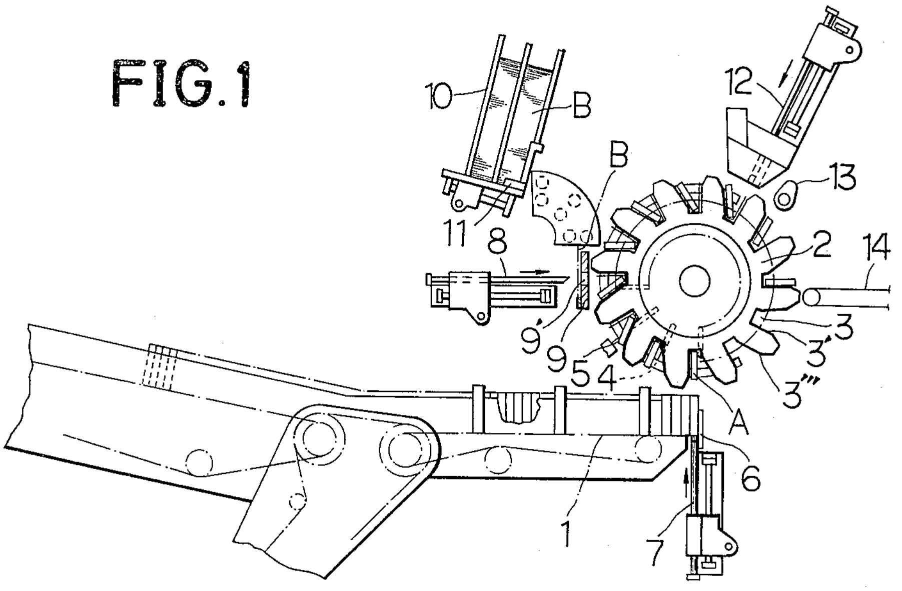
FIG. 1 is a front view.
Figure 2:
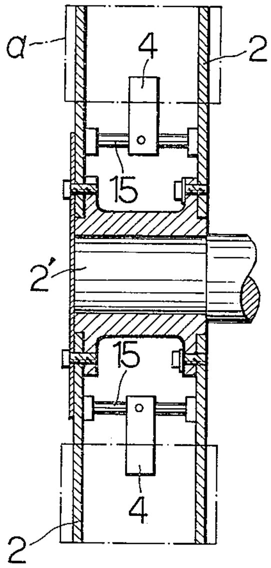
FIG. 2 is a longitudinal sectional side view of the turret discs.
Figure 8:
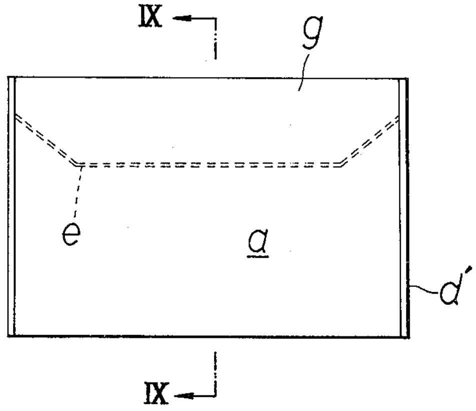
FIG. 8 is a side view of the case.
Figure 9:
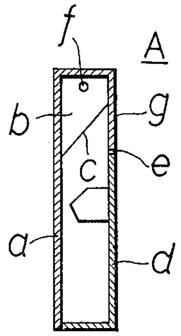
FIG. 9 is a sectional view taken on the line IX—IX of FIG. 8.
Figure 10:
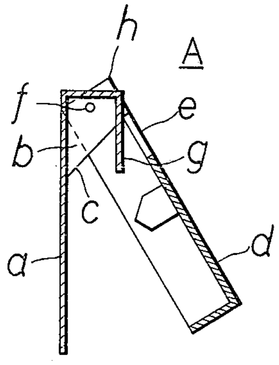
FIG. 10 is a sectional view of an opened case.

Referring to FIG. 1, 1 is a transferring endless belt, and a number of cases A are transferred on their heads as shown in FIG. 9 in a line on the belt 1 with their lids *a* back. As shown in FIGS. 8 to 10, the case A is constructed such that the lid *a* is provided with a pocket *b*, and the lower portion of the end wall *c* of the pocket *b* and that of the end wall *h* of a receptacle *d* are attached at the right and left hand sides by means of a pivot *f* so that the lid *a* may easily be opened from and closed to the receptacle. The pivot *f* acts as a fulcrum in this case, and the receptacle *d* is provided with a notch *e* in its lower portion so that the end wall *g* of the pocket *b* is fitted to the notch *e*.

As shown in FIG. 1, a stopper 6 is placed at the front end of the endless belt 1, and a pusher 7 is arranged under the stopper 6 in order to push up the case A. Turret discs 2 are fixed to a shaft 2' above the belt 1 at a distance less than the length of the case A.

The turret discs 2 are radially provided with a number of concavities 3 in their peripheries. Each concavity 3 has a straight surface 3' in its front end wall and a tapered surface opened to the periphery in its rear end wall. See FIG. 3.

A supporting member 15 is provided between the turret discs 2 in each concavity, and a keep plate 4 is attached in its base to each supporting member 15.

Each keep plate 4 has a tapered surface 4' in its tip, and may be pressed against the straight surface 3' of the concavity 3 by means of a spring (not shown).

An opening means 5 to open each case A is provided in a single place adjacent to the periphery of the turret disc. At the left and right hand sides of the turret discs 2 a pusher 8 is horizontally placed to insert each description into a pocket *b* of the lid *a* of the case. A guide 9 is arranged in the front of this pusher 8 so that a description vertically moves down along said guide, and has an aperture 9' through which the pusher 8 passes.

As shown in FIG. 1 there is provided above the pusher 8 a holder 10 to stock a large number of descriptions in pile and a delivery means 11 to forward the descriptions one by one. A pusher 12 for forwarding the recording tape cassette is provided at optional angles above the turret discs, and at a lower position of the right hand side than this pusher 12 a cam 13 is arranged to close the cases. 14 is a belt for discharging the cases.

Operation

Figure 3:
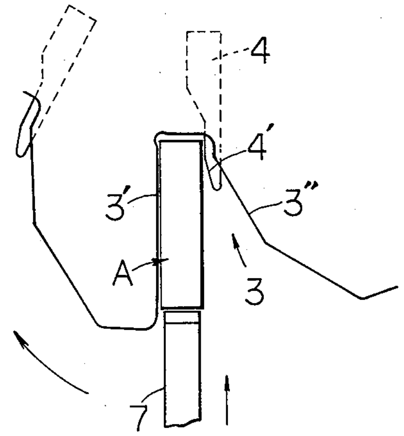
FIGS. 3–7 are operational views showing respectively, the case opening, the insertion of a description, that of a cassette, and the case closing.
Figure 4:
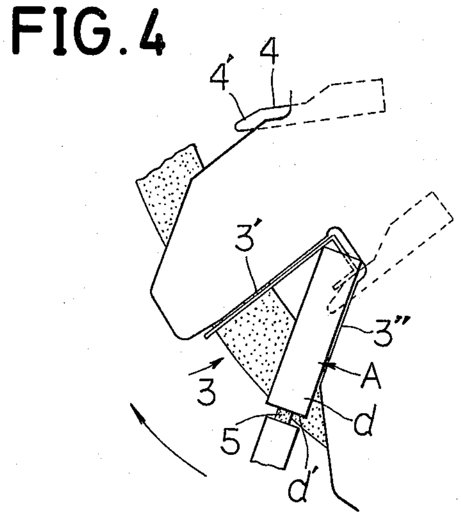
Figure 6:
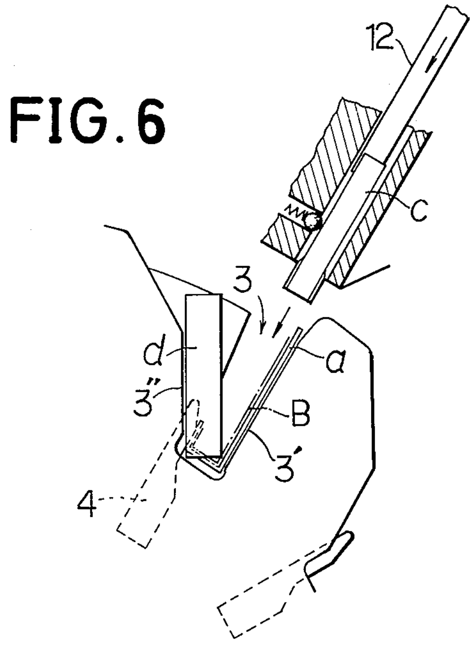

The cases A are transferred on a transferring endless belt 1 in an inverted state as shown in FIG. 9, and when a case reaches the stopper 6, the pusher 7 moves upwards, puts the case onto its upper surface, and inserts said case into the concavity. At this point, since the straight surface 3' of the front wall of the concavity serves as a guide for the case and, when the upward bottom of the case touches the tapered surface 4' of the keep plate, the keep plate 4 turns back against a spring (not shown) on the supporting member 15 acting as a fulcrum. The case slides deeper into the concavity along the straight surface 3' of the concavity, and is completely inserted into the concavity as shown in FIG. 3. In addition, the lid *a* of the case is pressed into abutment with the straight surface 3' by means of the keep plate 4, and the lid *a* is pressed particularly in the side wall of its pocket *b*, thereby supporting the case A in the concavity 3. With such arrangement, if the disc 2 is rotated intermittently, the opening means 5 is brought into abutment with the end wall *d'* of the receptacle *d* of the case A when the case A presses the opening means 5. Consequently, the receptacle *d* is opened about the pivot *f* as shown in FIG. 4 and rests against the tapered surface 3'' of the rear wall of the concavity. The case is thus opened. If the turret discs are further rotated, the end surface of the receptacle *d* comes into contact with a brush (not shown) fitted to the disc, thereby controlling the reaction of the receptacle *d* when the discs are stopped, as a result of the discs being braked.

Figure 5:
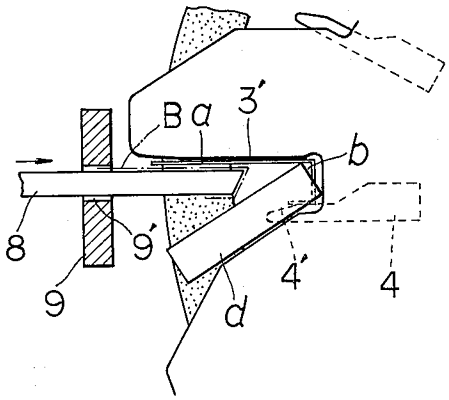

The pusher 8 is forwarded in the direction of the arrow head shown in FIG. 1 when the case A is stopped opposite to the pusher 8. The tip of the pusher pushes through the aperture 9' of the guide 9, a description B which has already passed along the guide 9 from the holder 10. In this case, the description B is forwarded, with its end folded in U-shape, into the pocket *b* of the lid *a* so as to fit along the inside surfaces of the lid *a* and the side wall *g*. See FIG. 5. After inserting the description into the pocket *b*, the pusher 8 returns to the rest position. Next, the pusher 12 operates to insert a recording tape cassette C which is pushed by the tip of the pusher 12 into the folded description in the case A when the case is stopped at a corresponding position opposite the pusher 12 as a result of a further rotation of the turret discs 2, and thereafter, the pusher 12 returns to the rest position.

Figure 7:
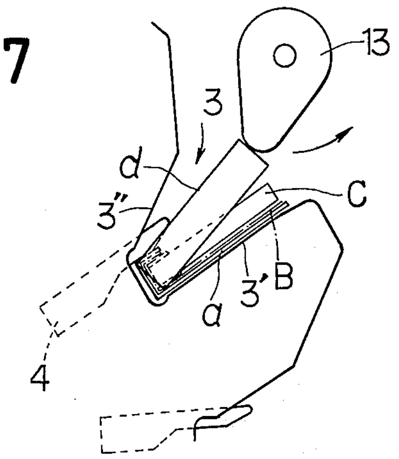

The turret discs 2 are further rotated and the case A is stopped at the position of the cam 13. Consequently, the cam 13 under rotation is brought into abutment with the rear wall of the receptacle *d* as shown in FIG. 7, and the receptacle *d* is moved about the pivot *f* in the opposite direction to the opening direction of the receptacle *d*, thereby closing the case. When the turret discs 2 are rotated to the position where the case A is discharged, the case A is detached from the keep plate, pushed out from the concavity onto the belt 14 by means of a device which is not illustrated, and forwarded to, for example, a subsequent packing process.

The device of the present invention is capable of inserting a description and a recording tape cassette successively and automatically into each case through the continuation of the foregoing operation.

In the foregoing operation, there are individual processes to press by means of the keep plates the pockets of the lids of the cases inserted into several concavities 3 provided at equal intervals on the periphery of the turret discs which are intermittently rotated so that the cases are supported in the concavities, to open the receptacle of the case during the intermittent rotation of the turret discs 2 by the use of the opening means, to insert a description into the pocket of the lid and a recording tape cassette into this description folded in the case, and to move the receptacle to the lid for closing the case upon inserting completely a description and a recording tape cassette. The present invention is characterized by automatic, successive, and efficient feasibility of these individual processes.

What is claimed is:

1. A device for inserting cassettes and a description thereof in a casing comprising a lid pivotally mounted on a receptacle said lid including an end wall and a pocket formed therein and said receptacle including a notch formed therein, said device comprising:

a. turret disc means comprising a plurality of concavities for receiving said casing and for carrying said casings, each concavity comprising a straight wall and an inclined wall;

b. first pusher means for inserting said casings into said turret disc means;

c. keep plate means extending into each of said concavities for engaging the end wall of said casing lid through the notch formed in said receptacle thereby holding said lid against said straight wall of said concavity;

d. opening means positioned with respect to said turret disc means for moving said receptacle against said inclined wall thereby opening said lid;

e. first insertion means positioned relative to said turret disc means for inserting said description into said casing;

f. second insertion means positioned relative to said turret disc means for inserting said cassettes into said casing;

g. closing means, positioned relative to said turret disc means, for closing said lid after said description and said cassette have been inserted into said casing; and h. discharge means positioned relative to said turret disc means for discharging said casings therefrom.

2. The device of claim 1, wherein said first insertion means comprises:

a. second pusher means for pushing said description into said casing;

b. guide means for guiding said description when pushed by said second pusher means; and c. holder means for storing said descriptions and for moving said descriptions into the path of said second means.

3. The device of claim 1, wherein said second insertion means comprises:

a. a third pusher means for pushing said cassette into said casing; and b. a guide means for guiding said cassette into said casing.

4. The device of claim 1, wherein said closing means comprises a cam for engaging said casing and moving it towards said lid whereby said lid is closed.

* * * * *